United States Patent [19]

Dempsey et al.

[11] 4,127,631
[45] Nov. 28, 1978

[54] THERMOFORMING PROCESS FOR POLYALKYLENE TEREPHTHALATE POLYESTER RESINS

[75] Inventors: Robert E. Dempsey, Wheaton; James L. Throne, Naperville, both of Ill.

[73] Assignee: Standard Oil Company, Chicago, Ill.

[21] Appl. No.: 738,179

[22] Filed: Nov. 5, 1976

[51] Int. Cl.$^2$ .............................................. B29C 17/04
[52] U.S. Cl. ..................................... 264/92; 528/271; 528/490
[58] Field of Search ................ 264/89, 90, 92, 93, 264/94; 260/75 T; 425/388

[56] References Cited

U.S. PATENT DOCUMENTS

| | | | |
|---|---|---|---|
| 3,496,143 | 2/1970 | Siggel et al. | 264/92 X |
| 3,830,616 | 8/1974 | Hawkins | 425/388 X |
| 3,960,807 | 6/1976 | McTaggart | 260/873 X |
| 3,961,008 | 6/1976 | Kuratsuji et al. | 260/75 T X |
| 4,020,126 | 4/1977 | Gander et al. | 264/92 X |

Primary Examiner—Jan H. Silbaugh
Attorney, Agent, or Firm—Stanley M. Welsh; Arthur G. Gilkes; William T. McClain

[57] ABSTRACT

A process for producing shaped articles of polyalkylene terephthalate resins involves thermoforming a substantially unoriented sheet of said resin which sheet has an average crystallinity thermally induced in the range of about 0% to 18% and an average temperature in the range of about 210°–300° F., in contact with a mold at a temperature in the range of about 240°–350° F. which mold is preferably at a higher temperature than said sheet. Optionally a differential in applied pressure below about 5 atmospheres can be utilized in the thermoforming.

17 Claims, 10 Drawing Figures

CHARACTERISTIC HALF-TIME DATA

THERMOFORMING PROCESS FOR POLYALKYLENE TEREPHTHALATE POLYESTER RESINS

BACKGROUND

1. Field of the Invention

This invention relates to low pressure thermoforming of polyalkylene terephthalate (PAT) resins.

2. Prior Art

Three examples of art disclosing thermoforming of polyalkylene terephthalate resin sheets are two to Siggel et al. U.S. Pat. No. 3,429,854 (1969) and U.S. Pat. No. 3,496,143 (1970), and one to McTaggart U.S. Pat. No. 3,960,807 (1976).

In Siggel et al. (U.S. Pat. No. 3,429,854), the thermoforming process disclosed consisted of: (1) heating with the I.R. heating system of an Illig Type U60 a polyethylene terephthalate sheet of 0.1 to 6 mm in thickness, having a percent crystallinity between 0% and 25% and a solution viscosity between 1.4–1.7 as measured in 1% meta cresol at 77° F., to a temperature in the range 167° F. to 356° F.; (2) shaping by means of atmospheric pressure on a mold surface (no temperature of the mold surface indicated), and (3) cooling immediately after shaping to a temperature below 158° F., whereby a thermoformed transparent sheet can be formed having a draw ratio of maximum depth to maximum width as high as 2.5:1. A funnel shaped mold wherein the maximum diameter equals 150 mm and the minimum diameter at a distance of 150 mm equals 20 mm was used along with some physical prestretching of the sheet prior to shaping on the mold in those cases where a deep-draw ratio in excess of about 1:1 was sought.

In Siggel et al. (U.S. Pat. No. 3,496,143), the thermoforming process disclosed consisted of: (1) heating with the I.R. heating system of an Illig Type U60 a polyethylene terephthalate sheet of 0.1 to 6 mm in thickness, having a percent crystallinity prior to heating between 5%–25% and a solution viscosity or relative viscosity as measured in a 1% meta cresol solution at 77° F. in the range 1.7 to 2.0, to a temperature between 185° F. and 392° F., (2) immediately shaping by means of atmospheric pressure on a mold surface (no temperature of the mold surface is indicated) while the I.R. heating system is turned off, and (3) further heating said shaped sheet with said heating system so as to maintain a temperature in the range 284° F. to 428° F. until a percent crystallinity of at least 25% is obtained. It is not made clear by the reference whether it is necessary or not to turn off the heating system during the shaping step or what the temperature of the mold surface is during the shaping step.

In McTaggart (U.S. Pat. No. 3,960,807),, the thermoforming process disclosed consisted of:

(1) heating an extruded 20 mil sheet containing:
  (a) polyethylene terephthalate having an inherent viscosity, as determined in a dilute trifluoroacetic acid solution at 86° F., of at least 0.75, a glass transition temperature of at least 122° F., and a melting point of at least about 302° F.;
  (b) a crack stopping agent; and
  (c) a nucleating agent; to a temperature on the order of 250° F., (2) shaping said sheet to a mold (mold temperature during shaping is not given); and (3) raising the temperature of the mold to a temperature in the range of 275° F. to 374° F. and allowing the shaped sheet to remain in contact with the mold for 20 seconds to 3 minutes.

The average crystallinity preferred at various points in the process are not given. In one example, an initially amorphous sheet after shaping to a mold surface and prior to heat annealing is expressly disclosed to still be amorphous.

It is to be noted that average crystallinity of a polyalkylene terephthalate (PAT) sheet is given as a percent by weight of crystalline material as based upon the total weight of said sheet and is throughout the Specification and Claims, unless otherwise specifically indicated, thermally induced. Shear induced crystallinity in PAT, even if followed by thermal annealing, will have a different crystalline morphology resulting in generally lower melting and softening temperatures than PAT having only thermally induced crystallinity.

It is known that if sufficiently large pressures on the order of 10–50 atmospheres are used shaped articles can be formed from sheets of PAT having a thermally induced average crystallinity in the range of about 25–30%. In order to achieve said sufficiently large pressures, large and very expensive machinery must be employed.

It is further known that, in general, if a PAT sheet has too much thermally induced average crystallinity, i.e. above about 50%, it becomes very brittle and loses many of its desirable properties. The final overall crystallinity of a PAT sheet is known to depend upon the concentration and particle size of any crystallization promoter therein. Rate of crystallization for example tends to increase both with a decrease in particle size of said promoter and, at a concentration up to about 1%, with an increase in concentration. Final average crystallinity after annealing, however, depends only on concentration of a particular crystallization promoter. A concentration of such promoters above about 1% generally results after annealing in a PET sheet having a thermally induced average crystallinity above 60%.

BRIEF DESCRIPTION OF THE INVENTION

It is an object of this invention to provide a commercially practical continuous thermoforming process which allows the formation of shaped PAT articles at production rates of 2400–4800 articles/hour wherein 10 molds/cycle are being used.

It is an object of this invention to provide a commercially viable thermoforming process which takes a PAT sheet directly to a thermoformed article of crystalline PAT, i.e., PAT having a thermally induced average crystallinity of at least 20%, which process utilizes thermoforming machinery conventionally used to produce thermoformed articles of polyethylene, polystyrene, predominantly amorphous PAT resins, and the like.

It is an object of this invention to provide a process wherein a sheet of predominantly amorphous PAT can be thermoformed by means of a differential in applied pressure of less than about 5 atmospheres in a mold at a temperature in the range of 240°–350° F. into a finished article having a crystallinity of at least 20%, which finished article will not with subsequent use become very brittle, and which can be used without melting or distorting when subjected to heating to a temperature of about 400° F. for an hour or more.

Other objects will be clear from reading this Specification.

It has been found that those time dependent processes occurring during a conventional thermoforming step which lead to a loss of dimensional integrity of a sheet of PAT can be balanced by other time dependent processes leading to a stabilization of dimensional integrity so that a predominantly amorphous sheet of PAT can be thermoformed directly into a thermoformed article of crystalline PAT on process equipment conventionally used with thermoplastic materials such as polystyrene, polyethylene, amorphous PAT, and the like.

The time dependent processes leading to a loss of dimensional integrity in a thermoforming step involve time dependent forces used to conform a PAT sheet to a mold surface and the rate of heat transfer from said heated mold surface to said PAT sheet.

The time dependent process leading to a stabilization of dimensional integrity of said PAT sheet in a thermoforming process step is the process of crystallization which is dependent upon an initial rate of crystallization of said PAT sheet increased by the heat transferred from a heated mold. It has been found that this initial rate and subsequent rate change in crystallization of a sheet is controlled by five factors: (1) the half-time for crystallization at some temperature of the sheet, (2) the film thickness of the sheet, (3) the thermally induced average crystallinity of the sheet just prior to contact with a heated mold, (4) the average initial temperature of the sheet just prior to contact with said mold, and (5) the temperature of said mold. It is to be noted that average crystallinity and the half-time for crystallization of the sheet are coupled variables in the process disclosed by this invention.

PAT sheets having a half-time for crystallization at 410° F. much below 0.5 minute are very difficult to handle. This is because the lower the half-time for crystallization, the generally lower must be the average crystallinity of the sheet just prior to contact with the heated mold. To thermoform a material with a half-time for crystallization much below 0.5 minute having both a low thermally induced average crystallinity and an average temperature in the range of about 210°-300° F. is generally very difficult, because the rate of heating of a totally amorphous PAT sheet must be very rapid to permit one to form such a sheet at all, and even if formed, the length of time such a sheet can exist as a usefully thermoformable sheet can be very short, i.e., on the order of less than about a tenth of a second.

Sheets having a half-time for crystallization at 410° F. of much more than 5 minutes become commercially impractical for the disclosed thermoforming process. This is because the length of time necessary is on the order of minutes for such sheets (i) to reach a thermally induced average crystallinity in the range of about 0% to 18% at a temperature in the range of about 210°-300° F. and subsequently, (ii) to be shaped in contact with a mold at 240°-350° F. and allowed to remain in such contact until a 20% average crystallinity is achieved. A commercially attractive thermoforming process requires (i) and (ii) both to be achieved on the order of about 30 seconds.

In general, the lower is the half-time for crystallization at 410° F. of a PAT sheet, the faster is the initial rate of crystallization at all temperatures for an amorphous sheet or web of said PAT. Rapidly heating, as for example by means of an infrared heating source, generally produces a thermal gradient. The thicker a particular sheet or web is, the greater generally are the maximum differences in temperature therein.

The thickness of a particular PAT sheet is primarily limited by the particular method of heating in so far as such heating produces significant variations in temperature throughout a sheet. It is to be noted that such variations in temperature induce variations in crystallinity throughout the sheet. Thus if a PAT sheet is too thick for a particular method of heating, then before the interior areas of said sheet have reached that thermoforming temperature in the range of about 210°-300° F., the crystallization at or near the surface has proceeded to such an extent that the sheet is no longer thermoformable at low pressure.

The thermoforming temperature range is primarily determined at the lower end, by the fact that at lower and lower temperatures a PAT sheet becomes more and more stiff and eventually loses that minimal amount of flexibility necessary for proper thermoforming; and at the upper end, by the fact that at higher and higher temperatures said PAT sheet becomes more and more flexible and eventually loses that minimal amount of dimensional integrity necessary for proper thermoforming. The precise point when the high and low limits are reached for a particular PAT sheet or web depends in part on the average crystallinity throughout that sheet or web.

Other things being equal, as the sheet temperature increases from 270° F. to 300° F., it becomes more difficult to handle the sheet because of an increased rate of crystallization, and as sheet temperature decreases from 225° F. to 210° F. the sheet becomes more stiff and ultimately loses that minimal amount of flexibility necessary for proper low pressure thermoforming. Likewise as the mold temperature increases from 310° F. to 350° F., the sheet acts progressively more amorphous with respect to contact with the mold (see FIGS. 5 and 8). As the mold temperature decreases from 270° F. to 240° F., the rate of crystallization decreases and the process becomes unduly long. Accordingly, it is preferred to contact a PAT sheet at a temperature in the range of 225° F. to 270° F. with a mold at a temperature in the range of 270° F. to 310° F.

The following discloses the specific conditions necessary to carry out a process of this invention in view of the time dependent processes going on.

Generally the process of this invention comprises thermoforming a polyalkylene terephthalate sheet or web which has a half-time for crystallization at 410° F. below about 5 minutes, and preferably below about 3 minutes and of at least about a half a minute, and which has an average temperature in the range of about 210°-300° F. and preferably about 225°-270° F., and a thermally induced average crystallinity in the range of about 0% to 18% and preferably about 5% to 15%, by:

(a) contacting said sheet with a mold which is at a temperature in the range of about 240°-350° F. and preferably in the range of about 270°-310° F. wherein said mold is preferably at a higher temperature than said sheet prior to contact therebetween;

(b) applying forces comprising a differential in applied pressure to said sheet so as to make a thermoformed sheet which conforms to said mold;

(c) allowing said thermoformed sheet to remain in contact with said mold until an average crystallinity of at least 20% is achieved;

(d) removing said thermoformed sheet from said mold; and (e) allowing said thermoformed sheet to cool.

The process of this invention, as distinguished from the cited art, discloses during the shaping step of a thermoforming process the use of a heated mold which is preferably at a higher temperature than said sheet prior to contact therebetween. Further, limitations as to rate of crystallization as indicated by the half-time for crystallization at some reference temperature, and a temperature range for the heated mold are critical in this process but are not taught in the cited art. Two unexpected results from using a heated mold versus an unheated mold are: (1) that there is no problem during heat annealing from either shrinkage or inhibition of crystallization because of any shear induced orientation which can be introduced during the shaping of a sheet to a mold and (2) superior wall thickness uniformity is in general achieved. The greater the draw ratio which in turn generally involves greater shear stresses and more orientation that is generally induced which in turn inhibits thermally induced crystallinity and also which generally increases shrinkage.

Inherent viscosity (i.v.) of a PAT resin is used throughout the Specification and Claims to mean that viscosity in dl/g determined at 86° F. ± 0.09° F. for 0.1 g ± 0.003 g of said PAT resin in 25 mls of solution. The solvent of said solution is a mixture in percent by weight of 60% phenol and 40% tetrachloroethane. The numerical calculation used to interpret the data is the Billmeyer Equation. The experimental procedure followed is very similar to ASTM D 1243.

It is to be noted that a particular PAT which has either 0.40 or 0.75 i.v. when measured in a 60% phenol:40% tetrachloroethane solvent at 77° F. has respectively either 1.4 or 2.0 inherent viscosity when measured in a 1% solution in meta-cresol at 77° F.

A polyalkylene terephthalate (PAT) resin is defined throughout the Specification and Claims to consist of film forming polyesters comprising terephthalic acid moieties and one or more aliphatic diol moieties. The term "moiety" is used to indicate that portion of either the terephthalic acid or the diol which is incorporated into the polyester resin. Examples of diols which can be used are 1,2-ethanediol, 1,4-butanediol, and 1,4-cyclohexanedimethanol. Based upon total moles of terephthalic acid moieties, there can be added up to about 10 mole percent and preferably less than 5 mole percent of one or more aromatic dicarboxylic acid moieties selected from the group of aromatic dicarboxylic acids consisting of isophthalic acid, orthophthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenylaminodicarboxylic acid, 4,4'-diphenylmethyldicarboxylic acid, 4,4'-oxydiphenyldicarboxylic acid, and 4,4'-[1,2-diphenylethane]dicarboxylic acid.

The half-time for crystallization of a material is defined throughout this Specification and Claims with reference to the classical Avrami equation $$-\ln x = Kt^n$$

where $x$ is the fraction of uncrystallized material and is equal to

[1 − (change in volume at time, $t$)/(change in volume at time, $t$ = infinity)]

and where $K$ and $n$ are empirical coefficients found with respect to said material, to mean that time, $t_{\frac{1}{2}}$, found in the above equation when $x = 0.5$.

A known technique for measuring a half-time is given by J. H. Magill in Polymer V.2, page 221 (1961) in an article entitled "Depolarized Light Intensity Technique." In FIG. 10, the curves labeled A–E of half-time for crystallization measured by the above cited technique for a series of compositions which were made as disclosed in EXAMPLE 1 are plotted in a manner consistent with the classical Avrami equation as a function of temperature in ° F. The specific composition used to generate the data for each curve is for A, Goodyear VFR 3801 (0.6 i.v.); for B, Arnite A200 (1.0 i.v.); for C, Goodyear 5041 (1.0 i.v.); for D, Goodyear 5041 + 0.3% talc; and for E, Goodyear 5041 + 0.6% talc.

A differential in applied pressure is defined throughout the Specification and Claims to mean the difference in pressure between that lesser pressure on the side of the sheet to be thermoformed which is nearer to the mold surface and that greater pressure on the side of the sheet opposite thereto.

A PAT sheet useful in the process disclosed by this invention can be made by: extruding at a temperature in the range of about 545°–570° F. a PAT composition comprising: PAT, having an inherent viscosity in the range of about 0.5–1.4 dl/g and preferably of about 0.6–1.0 dl/g and a crystallization initiator present in a concentration in said PAT composition so that said PAT composition has a half-time for crystallization at 410° F. of less than about 5 minutes, onto a chill roll at a temperature in the range of about 90°–120° F. and preferably in the range of about 90°–110° F. An extruded PAT sheet becomes very susceptible to cracking on changing directions around rollers as the temperature of the sheet is lowered much below 90° F. On the other hand, a chill roll above about 120° F. will not cool the molten extrudate fast enough to avoid the introduction of crystallization above about 10%. Other methods for forming such PAT sheets generally include heating to a molten or amorphous state followed by rapid cooling. Methods for rapid cooling are well known in the art and include quench baths using a liquid substantially inert to the heated PAT sheet such as water and the like.

It is to be noted that the extrudate is to be brought into contact with said chill roll so that no orientation or substantially no orientation is induced in the final sheet and there is a thermally induced average crystallinity in the finished sheet of less than about 10% and preferably less than about 5%. The amount of average crystallinity in the extruded sheet will depend upon how rapidly the extruded sheet is cooled, which in part depends upon the thickness of said sheet. If there is too much orientation in the sheet, heating before and during thermoforming will tend to induce substantial undesirable shrinkage. Such shrinkage can interfere with the thermoforming process.

In another embodiment of this invention, the process for thermoforming a polyalkylene terephthalate resin sheet comprises:

(1) forming said sheet so that it is substantially unoriented, has a thermally induced average crystallinity in the range of about 0–10%, and has a half-time for crystallization at 410° F. below about 5 minutes and preferably below about 3 minutes and above about 0.5 minutes, (2) heating said sheet to an average temperature in the range of about 210°–300° F. and preferably in the range of about 225°–270° F. at such a rate (generally for example on the order of 10°–25° F./sec.) that by the time that said sheet has reached said temperature said sheet has an average crystallinity in the range of about 0% to 18%, and preferably about 5% to 15%, (3) thermoforming said sheet by:
(a) contacting said sheet with a mold which is at a temperature in the range of about 240°–350° F. and preferably in the range of about 270°–310° F. wherein said mold is preferably at a higher temperature than said sheet prior to contact therebetween;
(b) applying forces comprising a differential in applied pressure to said sheet so as to make a thermoformed sheet which conforms to said mold;
(4) allowing said thermoformed sheet to remain in contact with said mold until an average crystallinity of at least 20% is achieved;
(5) removing said thermoformed sheet from said mold;
(6) allowing said thermoformed sheet to cool; and
(7) trimming said thermoformed sheet.

It is to be noted that the step of trimming can precede the step of allowing the thermoformed sheet to cool to room temperature and the total cycle time requires about 30 seconds.

The maximum differential in applied pressure is determined by the tendency of the PAT sheet to be drawn into any vacuum passages present in a mold. Generally the greater the differential in applied pressure, the more the thermoformed sheet will conform to the surface of the mold and the better the definition of the finished thermoformed part. It is to be noted however that the PAT sheets made according to this invention can be thermoformed satisfactorily at a differential in applied pressure below 5 atmospheres and preferably as low as about one atmosphere as discussed in Example 3.

Methods for producing a differential in applied pressure are well known. Use of differentials in fluid pressure, such as with air, or a combination of reduced fluid or air pressure on one side with a solid cooperating surface on the other side are two known examples.

Any crystallization initiator can be used which in concentrations of up to about 1 part by weight to 100 parts by weight of PAT which forms a homogenous blend with said PAT resin wherein there results a composition having a half-time for crystallization at 410° F. below about 5 minutes and preferably below about 3 minutes and above about 0.5 minutes. As is well known, the more surface to volume of a particular initiator, the more effective it is as an initiator of crystallization. Examples of such initiators are $TiO_2$, talc, MgO, $BaSO_4$, $SiO_2$, $Al_2O_3$, CdO, ZnO, mica, fuller's earth, diatomateous earth, and asbestos or the like. In general, initiators perform satisfactorily which have a median particle size in the range of about 1 to 5 microns wherein 95% of the particles have a size which is below about 10 microns and substantially all of the particles have a size which is below about 100 microns and which are present, in the composition of 100 parts by weight of PAT, in the range of 0.1–1 part, and preferably of about 0.2–0.6 part. Median particle size is defined throughout the Specification and Claims to mean a particle size in a distribution of particles wherein 50% of the particles are larger than said particle size. It is to be noted that too high a concentration by weight of a crystallization initiator, i.e. much above about 1 part can increase the half-time for crystallization and also can induce an annealed average crystallinity above 60% and that if the initiator particle size is too large undesirable discontinuities appear in the extruded PAT sheet commonly referred to in the art as "gel particles".

Polyethylene terephthalate resin having a crystallization initiator and having an inherent viscosity in the range of about 0.5–1.4 dl/g, and preferably in the range of about 0.6–1 dl/g, has been found to work satisfactorily.

It is to be noted that during the thermoforming process as a PAT sheet is being made to conform to a mold surface it must not become in some areas so oriented that the process of thermally induced crystallization in said areas is substantially inhibited.

In still another embodiment of this invention, a process is provided to permit thermoforming of PAT sheets to a draw ratio in excess of about 3 without introducing so much orientation that shrinkage and crystallization inhibition become problems.

In general, the process for deep-draw thermoforming a sheet of a polyalkylene terephthalate resin which is substantially unoriented, has a half-time for crystallization at 410° F. below about 5 minutes, is at an average temperature in the range of about 210°–300° F., and preferably in the range of about 225°–270° F. and has an initial thermally induced average crystallinity in the range of about 0% to 18%, and preferably in the range of about 5% to 15%, comprises:
(a) contacting said sheet with a deep-draw mold which is at a temperature in the range of about 240°–350° F. and preferably in the range of about 270°–310° F. wherein said mold is preferably at a higher temperature than said sheet prior to contact therebetween;
(b) applying forces comprising a differential in applied pressure to said sheet so as to make said sheet conform to said mold, whereby a thermoformed sheet having a draw ratio in excess of about three can be achieved;
(c) allowing said thermoformed sheet to remain in contact with said mold until an average crystallinity of at least about 20% is achieved; and
(d) removing said thermoformed sheet from said mold.

It is to be noted that if the shaped or thermoformed sheet does not have to withstand prolonged heating at 400° F., it can be removed from the mold before 20% thermally induced average crystallinity has been achieved.

DETAILED DESCRIPTION OF THE INVENTION

Figure 10:
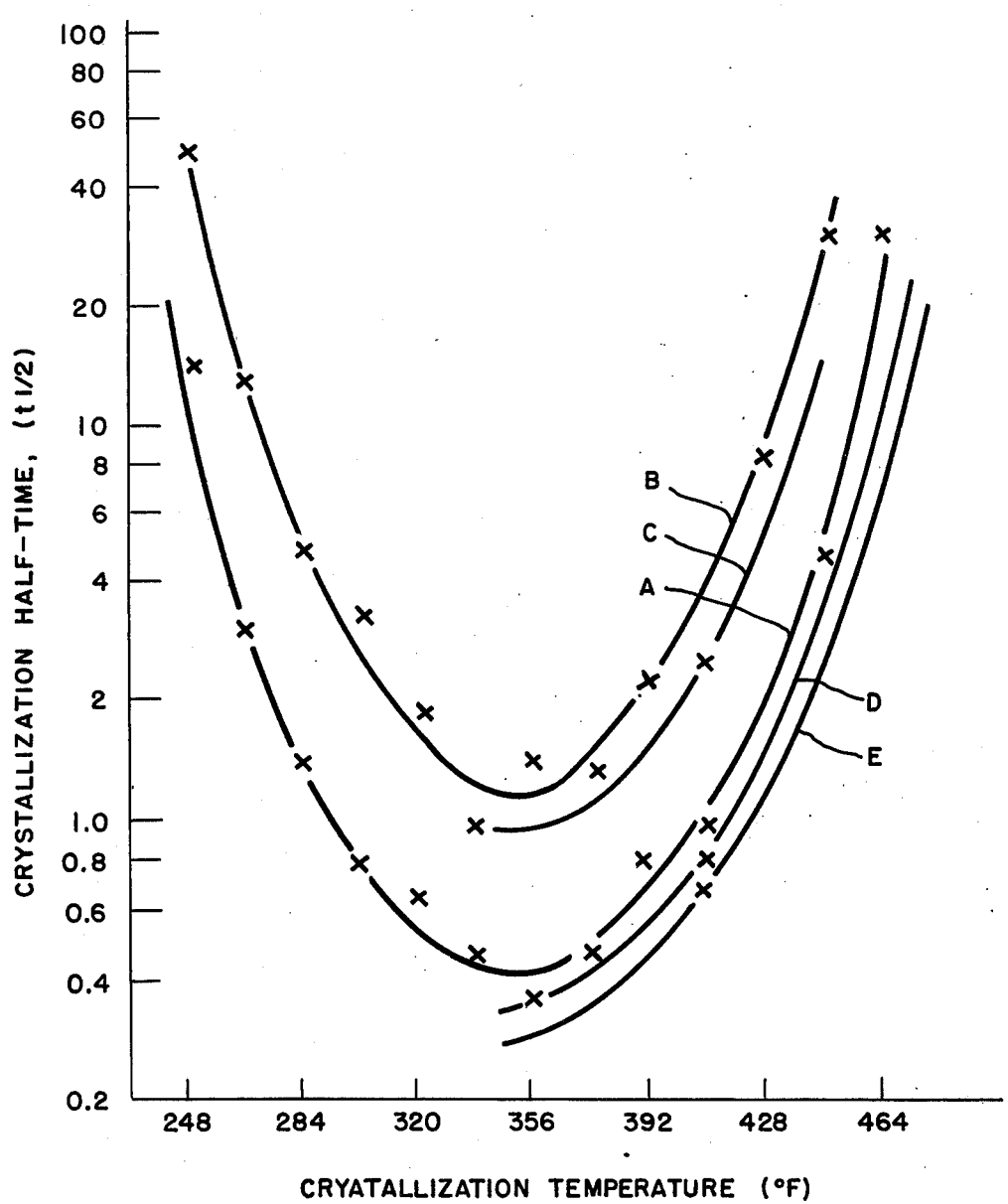

In FIG. 10, the curves labeled A-E of half-time for crystallization for a series of compositions are plotted in a way consistent with the classical Avrami equation as a function of temperature in ° F. The specific composition used to generate the data for each curve is for A, Goodyear VFR 3801 (0.6 i.v.); for B, Arnite A200 (1.0 i.v.); for C, Goodyear 5041 (1.0 i.v.); for D, Goodyear 5041 + 0.3% talc; and for E, Goodyear 5041 + 0.6% talc.

Figure 1:
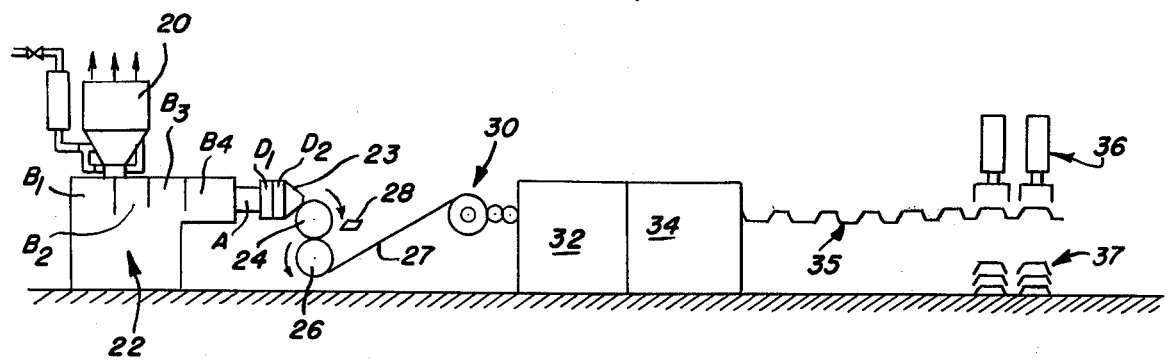
FIG. 1 is a continuous thermoforming line for trimmed PAT articles.

In FIG. 1, there is a continuous thermoforming line for PAT articles comprising a hopper-dryer 20, an extruder 22, a die head 23 chill rolls 24 and 26, an air knife 28, a series of drive rolls 30, a heating section 32, a thermoforming section 34, and a die cutter 36. The hopper-dryer 20 is a typical dehumidifying dryer-hopper for processing PAT, such as Model No. 100CL sold by Whitlock, Inc., and is necessary in order to maintain the PAT in a dry condition.

Briefly, the continuous thermoforming line for PAT articles operates as follows. Into hopper 20 is fed a PAT resin composition which is heat plasticized by extruder 22 which has four barrel zones numbered $B_1$, $B_2$, $B_3$, and $B_4$ with an adaptor A and a die head 23 having two zones $D_1$ and $D_2$. The plasticized PAT is extruded through die head 23 onto chill roll 24 rotating in the direction of the arrows. Care is exercised in the extrusion of the PAT so that there is as little orientation introduced into the extruded sheet of PAT as possible. This means that the PAT as it is extruded from die head 23 does not fall a significant distance to the top surface of chill roll 24. This avoids the introduction of orientation due to stretching caused by the weight of falling PAT resin. The temperatures of chill rolls 24 and 26 are in the range of about 90°-120° F. and preferably about 90°-110° F. The amorphous, i.e. less than 10% thermally induced average crystallinity and substantially unoriented PAT sheet 27 is carried by means of a series of drive rolls 30 into a heating section 32 where the PAT sheet is heated to a temperature in the range of about 210°-300° F. Subsequent to being heated and while remaining in said heated condition, said PAT sheet is thermoformed in section 34. The thermoformed sheet of PAT 35 is transferred as a sheet to die cutter 36 where the PAT is cut into individual articles 37. Details as to temperatures in the respective zones of extruder 22 and other processing conditions are given in Example 1.

Figure 2:
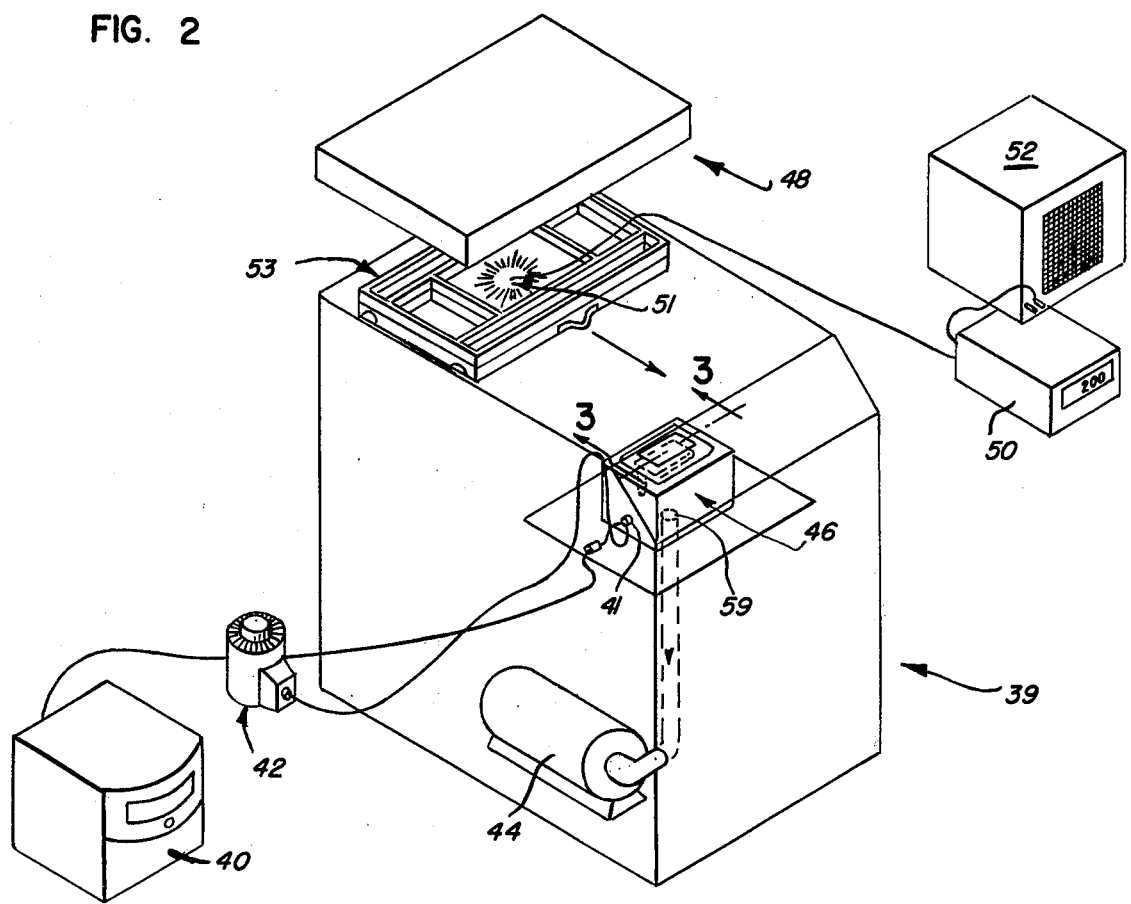
FIG. 2 is a laboratory apparatus used to thermoform PAT articles individually.

In FIG. 2, there is a rheostat 42, a vacuum pump 44 connected to a male mold 46, a heating section 48, a frame 53, a digital temperature readout 50, a plotter 52 of temperature versus time of a PAT sheet, and a mold temperature indicator 40 connected to thermocouple 41 which continuously monitors the temperature of male mold 46. Digital temperature readout 50 records on a sheet in plotter 52 the temperatures of a PAT sheet which is determined with a thermocouple 51 embedded therein. Vacuum pump 44 is connected to male mold 46 so as to introduce a pulling action on a sheet of PAT brought in contact with said male mold. The thermoforming process as influenced by the crystallinity of a PAT sheet just prior to contact with a heated mold will be considered in more detail with respect to FIGS. 3, 4, 5, 6, 7, and 8.

Figure 3:
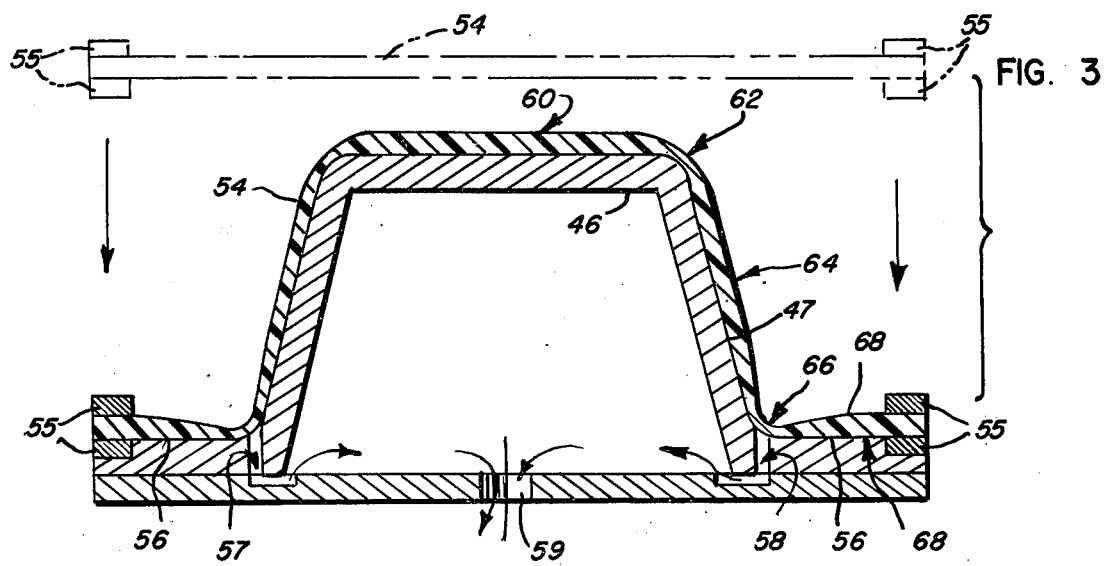
FIG. 3 is an enlarged cross-sectional view of a male mold along line 3—3 of FIG. 2 showing a PAT sheet of the optimal thermally induced average crystallinity both before and after said sheet contacts said mold.

The Comet Lab Master 39 disclosed in FIG. 2 operates as follows. A PAT sheet is placed in frame 53 and heated in section 48 to a thermoforming temperature which will be discussed in more detail in the examples. Frame 53 is moved in the direction of the arrow so as to place the PAT sheet held therein in thermoforming relation to male mold 46. As shown in FIG. 3 the PAT sheet held by clamps 55 of frame 53 is moved relative to male mold 46 so as to form a seal 56. Vacuum pump 44 creates a partial vacuum by means of passages 57, 58, and 59 between PAT sheet 54 and the outside surface 47 of male mold 46. Heating of male mold 46 is controlled by means of rheostat 42 powered by a voltage source not shown. The differential in applied pressure, determined by the reduced pressure caused by vacuum pump 44 on the side of the PAT sheet 54 nearer the surface 47 of mold 46 and the pressure of one atmosphere on the surface opposite surface 47, forces the heated PAT sheet 54 to conform to the mold surface. In FIGS. 3-8, the details of such conforming to a male or female mold surface for PAT sheets having too much, too little, and the proper amount of average crystallinity just prior to contact with said heated mold surfaces is considered.

Figure 6:
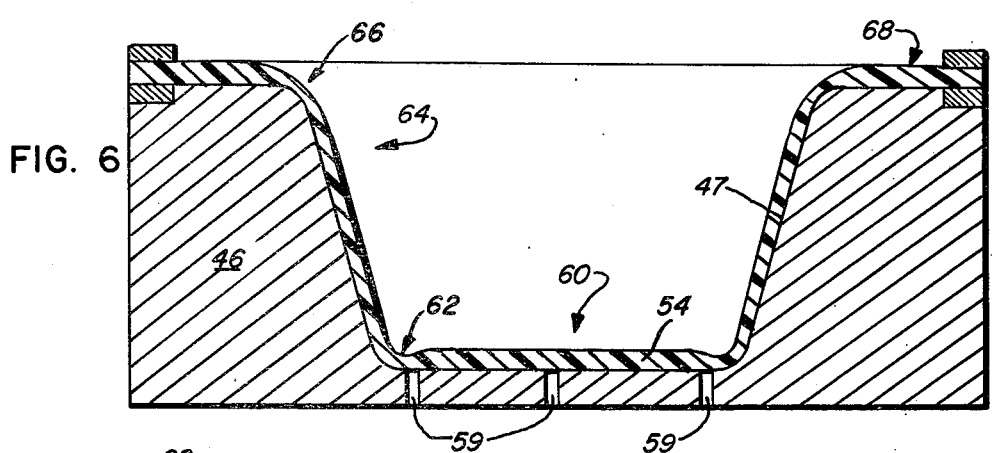
FIGS. 6, 7 and 8 are respectively cross-sectional views of female molds which are the female counterparts of the male molds shown in FIGS. 3, 4 and 5 contacted by corresponding PAT sheets of equivalent crystallinity, i.e. optimum, too crystalline, and too amorphous, respectively.

FIGS. 3 and 6 are discussed together because FIG. 3 shows male mold 46 while a female mold 46 is shown in FIG. 6. In FIGS. 3 and 6, the PAT sheet 54 which has the proper amount of average crystallinity just prior to contacting mold 46 conforms totally to the surface 47 of mold 46. The variations in thickness of said sheet over the surface of the mold 46 is considered with respect to various areas numbered 60, 62, 64, 66, and 68. The thickness in areas 60 and 68 are the same or approximately the same as the thickness of the PAT sheet prior to being thermoformed. In areas 62 and 66, there is a thinning out of the sheet at the curved surface. In addition to PAT being drawn away from said curve, the area of the curve is increasing and the volume of PET is staying roughly constant and therefore there is a decrease in thickness of the PET sheet. Area 64 is somewhat thinner than the thicknesses in areas 60 and 68.

Figure 4:
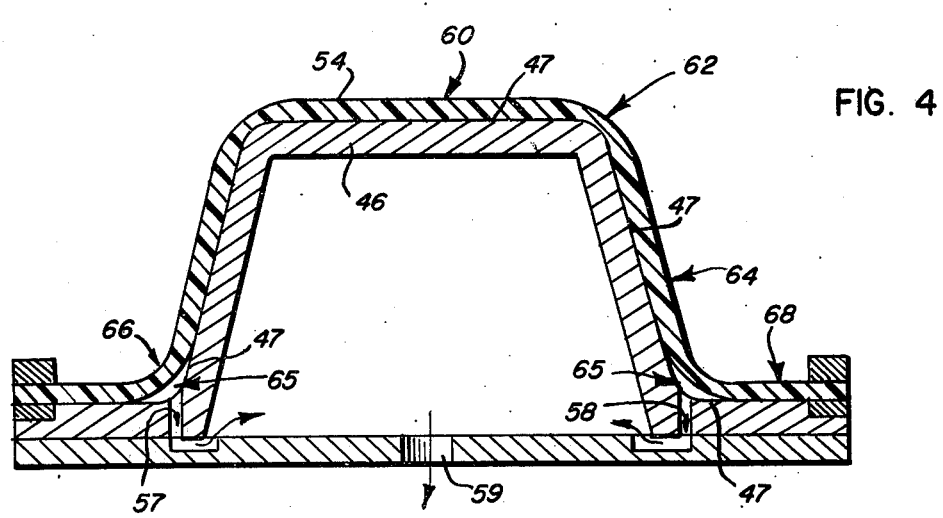
FIGS. 4 and 5 are cross-sectional views like FIG. 3 except that the thermoformed PAT sheets in contact with said male mold were just prior to contacting said mold too crystalline and too amorphous, respectively.
Figure 7:
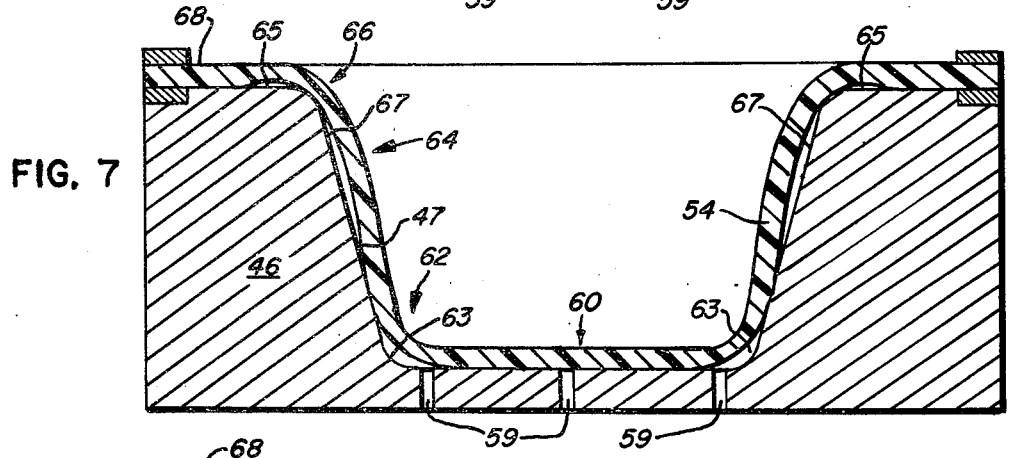

In FIGS. 4 and 7, a PAT sheet 54 which is too crystalline just prior to contacting heated mold 46 is disclosed. Corresponding areas to those discussed in FIGS. 3 and 6 are similarly numbered in FIGS. 4 and 7. The thickness of the PAT sheet 54 in FIGS. 4 and 7 in the area of 60 and 68 is the same or roughly the same thickness as the PAT sheet prior to being thermoformed. In areas 62 and 66 which correspond to a curved area, the PAT sheet is somewhat decreased in thickness. However, the amount that the sheet has become thinner is less than that amount in FIGS. 3 and 6. Area 64 is again somewhat thinner but is not so thin as in the case in FIGS. 3 and 6. It is to be noted that the PAT sheet 54 does not conform totally to the surface 47 of the mold 46. Void spaces 63, 65, and 67 in FIG. 7 and 65 in FIG. 4 indicate that the PAT sheet during thermoforming has not completely conformed to the mold surface 47. This lack of complete conformity to the mold surface by the PAT sheet is a symptom that the sheet was too crystalline prior to being thermoformed.

Figure 5:
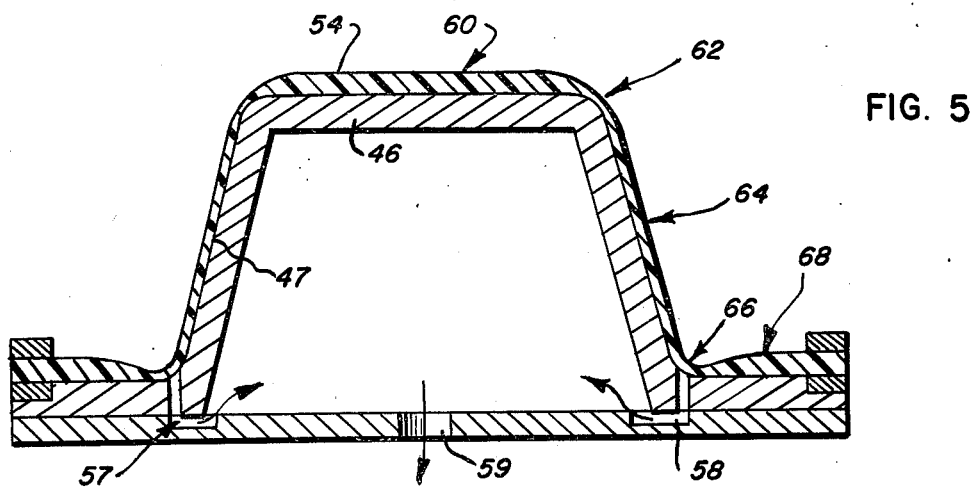
Figure 8:
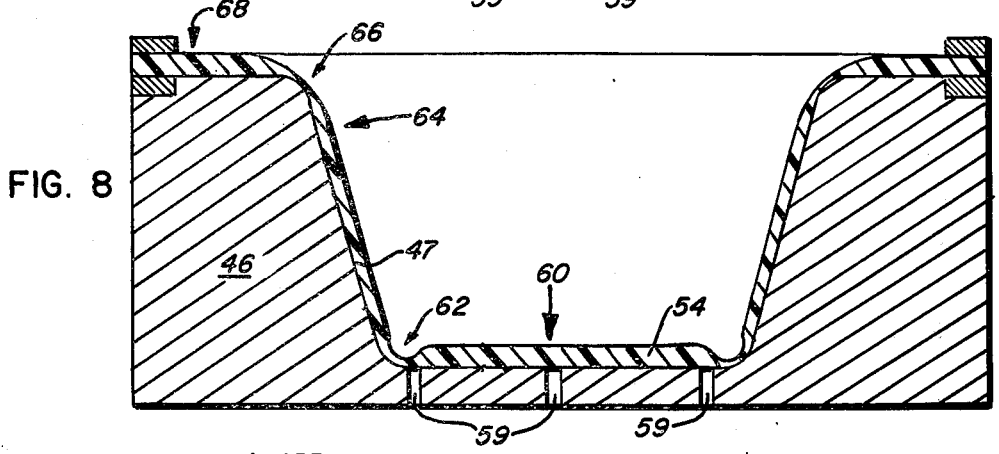

In FIGS. 5 and 8, the PAT sheet 54 was too amorphous just prior to contact with the heated mold 46. This results in a complete conformity of the PET sheet 54 to the surface 47 of mold 46, but the thinning out in areas 62 and 66 is much greater than in all other examples and in fact the amount of thinning that occurs in area 62 can be so great that the wall actually becomes an oriented sheet or film. As is well known orientation changes the crystalline morphology and thereby inhibits crystallization. In FIGS. 5 and 8, area 66 becomes considerably thinner than in all other examples. Areas 60 and 68 are roughly the same thickness as the PAT sheet is prior to being thermoformed. Area 64 is thinner in the case of the too amorphous sheet than in all other examples.

Figure 9:
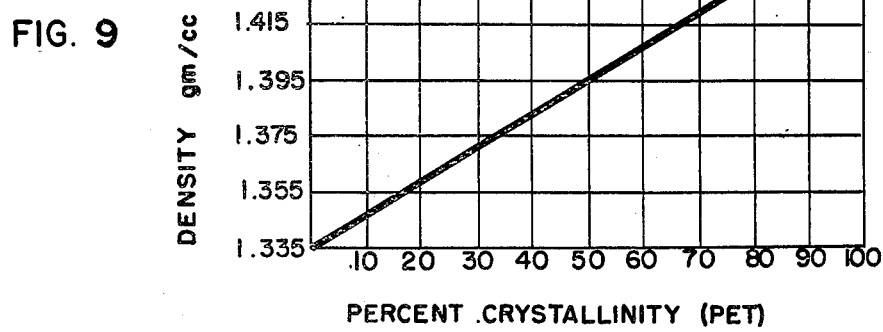
FIG. 9 is a graph relating density in grams/cc. and average crystallinity expressed as percent crystallinity of a polyethylene terephthalate sheet.

FIG. 9 is a graph relating the bulk density of a polyethylene terephthalate (PET) sheet as determined by flotation and the average crystallinity (percent crystallinity) of that PET sheet. This Figure will be considered in Example 2.

EXAMPLE 1—FORMATION OF A TALC NUCLEATED PET SHEET

A PAT composition consisting of Goodyear 5041 polyethylene terephthalate (PET) pellets having less than 50 ppm of moisture and 0.3% by weight of Polytal talc based on the total composition were drum tumble blended for about 30 minutes and then fed at a rate of 30 lbs/hr into the hopper of a 1½ inch Davis Standard Extruder. The barrel temperatures of the extruder were: for $B_1$, 558°–570° F.; for $B_2$, 560°–600° F.; for $B_3$, 530°–555° F.; for $B_4$, 535°–560° F.; for the adapter A, 525°–550° F.; for die head section $D_1$, 510°–540° F.; and for die head section $D_2$, 515°–540° F.. The extruded melt was at a temperature of 555°–560° F. under a pressure of about 100 psi. The sheet was 8 inches wide and the die opening was set at 80 mils. A two-stage PVC-type compression screw rotating at a rate of 120 rpm was used. No screen pack was used, however a breaker plate was in place. The casting speed was 25 feet/minute and the chill rolls were both at a speed matched to that.

Water was fed into the lower chill roll having a diameter of 8 inches at 69° F. and removed at a temperature of 81° F. The chill roll temperatures during operation equilibrated to temperatures between 90° and 110° F. The air knife directed a stream of air which was under a pressure of 26 psi and was at a temperature of about 70° F. The air knife angle was approximately 90° to the film surface at point of air contact. The finished sheet was 10 mils thick.

On a 2 ½" NRM extruder with substantially the same processing conditions as described above, a 20 mil sheet about 26 inches wide of Goodyear 5041 PET with 0.6% Mistron Vapor talc (Cypress Mining) were made. Also on said NRM, a 30 mil sheet about 30 inches wide was made with the same process conditions as for the 20 mil sheet except that the melt temperature was about 570° F., and the feed rate was about 100 lbs/hr.

EXAMPLE 2—AVERAGE CRYSTALLINITY DURING THERMOFORMING PROCESS

A linear density gradient column was prepared with toluene and carbon tetrachloride by a method well known in the art so that a linear density gradient at equilibrium ranging from 1.335 to 1.455 was established. The values for the degree of average crystallinity of various samples of PET were determined by both flotation in the above described linear density gradient column and by X-ray diffraction. The values were within 5% of each other. The values for the average crystallinity in the PET sheets made by the processes disclosed in Example 1 were always less than 3% and generally as low as 0% and the values for the half-time of crystallization at 410° F. of these PET sheets were about 1 minute.

In order to determine average crystallinity from density, the graph disclosed in FIG. 9 was used. The effect on observed density by the low concentration of crystallization initiator present was within experimental error, and therefore neglected.

As shown in FIG. 2, a Comet Lab Master thermoformer model L-5, made by Comet Industries, Illinois, was used to heat each sheet for which the average crystallinity was determined.

PET sheets of between 8.5 to 9.2 mils in thickness having a half-time for crystallization at 410° F. in the range 1–5 minutes and having a measured average crystallinity of 0.0% were made in a process substantially the same as described in Example 1. The PET sheets consisted of 99.7 parts by weight of a Celanese GBR 4070 (0.65 i.v.) PET and 0.3 part by weight (0.3% by weight) of Polytal talc. These sheets were heated in the heating section of the Comet thermoformer for a period of 2, 4 and 6 seconds. At the end of that period, each sheet was quenched with room temperature water to room temperature rapidly. The rate of crystallization for any PET sheet at room temperature is negligible and the average crystallinity therefore can be easily measured. It was assumed that the average crystallinity found after each PET sheet had been quenched to room temperature was essentially the average crystallinity of that sheet just prior thereto. From the density of each sheet, the corresponding crystallinity was determined by the graph shown in FIG. 9. The results are reported in column 2 of Table 1.

After heating different sheets of Celanese GBR4070 containing 0.3% by weight Polytal talc respectively for 2, 4 and 6 seconds, each sheet was allowed to stand in a room temperature environment for three seconds during which the sheet was no longer subjected to heating. Each sheet was then quenched to room temperature rapidly. It was assumed that the crystallinity of the sheet just prior to contact with the mold surface was given by the crystallinity determined after permitting the sheet to stand for three seconds in a room temperature environment. Note that the period of transferring the PET sheet from the heating section to the mold surface was set to be approximately 3 seconds.

TABLE 1

| Time of Heating in Seconds | Average Crystallinity Immediately After Heating | Average Crystallinity after 3 sec. in a room temperature environment |
|---|---|---|
| 2 | 5% | 5% |
| 4 | 5% | 5% |
| 6 | 5–8%* | 10–25%* |

*Variations in observed values, reported as a range, are due to inherent errors arising out of the experimental procedure followed when the rate of crystallization becomes very fast.

The average crystallinity after heating for respectively 2, 4, and 6 seconds and subsequently holding for 3 seconds in a room temperature environment are reported in column 3 of Table 1. Where satisfactory results occurred in later thermoforming (see Table 2) the average crystallinity just prior to mold contact with the PET sheets was found to be in the range of 0% to 18% and best results occurred, in the range of 5% to 15%.

Additional sheets of Celanese GBR 4070 containing 0.3% by weight of Polytal talc were respectively heated for 2, 4, and 6 seconds in the heating section. These sheets were then each held in a room temperature environment for 3 seconds and finally were respectively held in contact with a male mold having a temperature of 285° F. ± 5° F. for 8, 12 and 15 seconds. Each sheet was then quenched to room temperature rapidly and the average crystallinity determined as discussed above.

The average crystallinity of sheets after heating respectively for 2, 4, and 6 seconds, being held in a room temperature environment for 3 seconds and contacting respectively for 8, 12, and 15 seconds a mold having a temperature of 285° F. ± 5° F. is given in Table 2.

TABLE 2

| Heating Time (seconds) | Time in contact with Mold at 285° F. + 5° F. (Seconds) | Average* Crystallinity |
|---|---|---|
| 2 | 8 | 6% |
| 4 | 8 | 6–8% |
| 6 | 8 | 28–32% |
| 2 | 12 | 16–20% |
| 4 | 12 | 23–32% |
| 6 | 12 | 32–35% |
| 2 | 15 | 20–25% |
| 4 | 15 | 22–30% |
| 6 | 15 | 33–34% |

*Ranges in value for average crystallinity is explained in note to Table 1.

Optimal results were obtained consistently when just prior to removal from a heated mold the average crystallinity of the thermoformed sheet was in the range of about 20% to 30%. Thermoformed sheets, when removed from the mold with an average crystallinity of less than 20%, and then without prior heat annealing, sufficient to achieve at least 20% average crystallinity are subjected to temperatures of about 400° F. for about 1 hour, buckled and distorted, or in some instances even partially melted in those areas of greatest orientation.

EXAMPLE 3—THERMOFORMING A TALC NUCLEATED PET SHEET ON A MALE MOLD

For a picture of the apparatus used, see FIG. 2.

An 8 inch wide PET sheet of Goodyear 5041 (1.0 i.v.) PET resin with 0.3% by weight of Polytal 4615 talc supplied by Whittaker, Clarke, and Daniels, New Jersey, having a half-time for crystallization at 410° F. about 1 minute, and made in the process described in Example 1 was cut to provide a 2 inch excess around edges of mold and is clamped within the frame of Lab Master thermoformer, model L-5, made by Comet Industries, Illinois.

A single cavity male type aluminum mold which is 3 inches wide, 4 inches long and 1 inch deep, was heated to an indicated temperature of 285° F. ± 5° F. The temperature of the mold was monitored by means of a thermocouple which was fastened within the mold and within ¼ inch of the mold surface. The mold surface temperature was monitored on a standard dial indicator and controlled through a rheostat. The relationship between said mold and frame was such that when the mold is moved into contact with a PET sheet held in said frame a seal was formed between the sheet and the mold. A vacuum system was attached to the mold. The vacuum system achieved a vacuum of about 0.05 atmospheres.

Various dwell times in the heating section were tried in the course of this work. The mold dwell time was uniformly set for 10 seconds. After the top and bottom heaters had equilibrated, all recording devices for measuring the mold and sheet temperatures were started.

PET sheets of 10 mils were heated in the heating section for from 4 to 8 seconds, and then transferred to said mold in a period of 4 ± 0.5 seconds. The mold was then brought into engagement with said sheet and held in place for 10 seconds after which time the thermoformed PET sheet was automatically removed from the mold.

PET sheets of 30 mils were heated in the heating section for from 9 to 18 seconds and then transferred to the heated mold in the same fashion as the above described sheet.

The series of runs showed the PET sheet temperature in the range of 235° to 265° F. yields satisfactory results for a 30 mil thick sheet and similarly, 225° to 265° F. yields satisfactory results for a 10 mil sheet.

The finished thermoformed sheets when allowed to cool to room temperature were found to have a percent average crystallinity in the range of 20 to 35%.

EXAMPLE 4—THERMOFORMING A TALC NUCLEATED PET SHEET ON A FEMALE MOLD

Processing conditions as used in Example 3 were used except that in place of the male mold there was a female mold in the form of a T.V. dinner tray. The T.V. dinner tray formed had the following dimensions: about 8 inches wide, 10 inches long, and 1 inch deep.

A 30 mil PET sheet consisting of 99.4 parts by weight of Goodyear 5041 PET resin (1.0 i.v.) and 0.6 parts by weight (0.6% by weight) of Mistron Vapor talc having a half-time crystallization of about 1 minute was used.

After the top and bottom heaters had equilibrated, a PET sheet held in a frame was heated for 14 seconds, then transferred to a female mold and held on the mold for 10 to 20 seconds. The mold temperature was set at 300° F.

The percent average crystallinity of the final thermoformed tray was found to be 33%, and the overall appearance of the thermoformed tray was excellent.

EXAMPLE 5—DEEP-DRAWN THERMOFORMING A TALC NUCLEATED PET SHEET ON A HEATED VERSUS UNHEATED MOLD

The mold used herein was a capped aluminum cylinder with a uniform 2" inside diameter × 3" outside diameter × 4.5" length. There was a ¼" diameter hole in a cap on one end through which a vacuum was applied by a Comet Lab Master Thermoformer model L-5. There was a rounded edge of 1/16" on the other end to avoid cutting into the PET sheet during thermoforming. During thermoforming the PET sheet is drawn under the influence of a vacuum into the hollow interior of said aluminum mold. Two different sheets, consisting of Goodyear 5041 PET nucleated with 0.3% by weight Polytal talc made as described in EXAMPLE 1, were each heated for 14 seconds, using 100% top and bottom heaters of a Comet Lab Master Thermoformer model L-5, to a thermoforming temperature in the range 270°–290° F.

One of said two sheets of 30 mils was shaped on said aluminum mold which was unheated and at a temperature of about 70° F., i.e., about room temperature.

The other of said two sheets of 20 mils was shaped under identical pressure conditions on said aluminum mold which was at a temperature of 305° F. and held in said mold for 14 seconds.

There was a substantial difference in how these two sheets molded. In the case of the unheated mold, the 30 mil sheet had thickness variations, as a function of cylinder radius, and depth of draw of the molded part, which agreed closely with theoretically predicted results given by J. G. Williams in the Journal of Strain Analysis, 5, 49 (1970). However, in the case of the heated mold, the 20 mil sheet deviated considerably from the results predicted by J. G. Williams in that the wall thickness versus depth was far more uniform.

The benefits from using a heated mold over a non-heated mold are: (1) the crystallinity of the 20 mil sheet was identified as thermally induced to approximately 25% and found to have excellent dimensional stability at 450° F. for 5 minutes, (2) a deep-draw was established performable to a depth as great as 2.25:1 without pre-stretching and without introducing stress induced crystallinity and/or without introducing so much orientation that thermally induced crystallinity was inhibited, and (3) superior uniformity in wall thickness.

The examples disclosed are intended to illustrate this invention. Variations on these examples are obvious to one of skill in the art and are intended to be within the scope of this invention.

The invention which is claimed is:

1. A process for thermoforming to a draw ratio in excess of about 3 of a polyalkylene terephthalate resin sheet is substantially unoriented, has a half-time for crystallization at 410° F. below about 5 minutes, is at an average temperature in the range of about 210°–300° F., and has an initial thermally induced average crystallinity in the range of about 0% to 18%, said process comprising:
   (a) contacting said sheet with a deep-draw mold which is at a temperature in the range of about 240°–350° F.;
   (b) applying forces comprising a differential in applied pressure to said sheet so as to make said sheet conform to said mold;
   (c) allowing said thermoformed sheet to remain in contact with said mold until an average crystallinity of at least about 20% is achieved; and
   (d) removing said thermoformed sheet from said mold;
   whereby a thermoformed sheet is made which has both a draw ratio in excess of about 3 and superior uniformity in wall thickness.

2. The process of claim 1, wherein said mold is at a temperature in the range of about 270°–310° F.

3. The process of claim 2, wherein said sheet is at a temperature in the range of about 225°–270° F.

4. The process of claim 3, wherein said initial thermally induced average crystallinity is in the range of about 5% to 15%.

5. The process of claim 3, wherein said differential in applied pressure is in the range of up to about 5 atmospheres.

6. The process of claim 3, wherein said differential in applied pressure is about 1 atmosphere.

7. The process of claim 3, wherein said resin is polyethylene terephthalate.

8. The process of claim 7, wherein said half-time for crystallization is below about 3 minutes.

9. A low pressure process for thermoforming a sheet consisting essentially of about 100 parts by weight of polyalkylene terephthalate resin and up to about 1 part by weight of a crystallization initiator, which sheet is substantially unoriented, has a half-time for crystallization at 410° F. below about 5 minutes, is at an average temperature in the range of about 210°–300° F., and has an initial thermally induced average crystallinity in the range of about 0% to about 18%, said process comprising:
   (1) contacting said sheet with a mold which is at a temperature in the range of about 240°–350° F.;
   (2) applying forces comprising a differential in applied pressure to said sheet so as to make said sheet conform to said mold, whereby a thermoformed sheet is made;
   (3) allowing said thermoformed sheet to remain in contact with said mold until an average crystallinity of at least about 20% is achieved; and
   (4) removing said thermoformed sheet from said mold.

10. A process for thermoforming a sheet consisting essentially of about 100 parts by weight of a polyalkylene terephthalate resin and up to 1 part by weight of a crystallization initiator comprising:
   (1) forming said sheet so that it is substantially unoriented and has a thermally induced average crystallinity in the range of about 0–10%, and has a half-time for crystallization at 410° F. below about 5 minutes;
   (2) heating said sheet an average temperature in the range of about 210°–300° F. at a rate so that by the time that said sheet has reached said average temperature, the average crystallinity of said sheet has increased to a value in the range of about 0% to about 18%;
   (3) thermoforming said sheet by:
      (a) contacting the sheet of Step (2) before there is either substantial cooling or a substantial change in the average crystallinity therein with a mold which is at a temperature in the range of about 240°–350° F.;
      (b) applying forces comprising a differential in applied pressure to said sheet so as to make said sheet conform to said mold, whereby a thermoformed sheet is made;
   (4) allowing said thermoformed sheet to remain in contact with said mold until an average crystallinity of at least about 20% is achieved; and
   (5) removing said thermoformed sheet from said mold and allowing said thermoformed sheet to cool.

11. The process of claim 10, wherein said mold is at a temperature in the range of about 270°–310° F.

12. The process of claim 11, wherein the sheet in step (3) (a) is at a temperature in the range of 225°–270° F.

13. The process of claim 12, wherein said resin is polyethylene terephthalate.

14. The process of claim 13, wherein said sheet has a half-time for crystallization at 410° F. below about 3 minutes.

15. The process of claim 12, wherein the average crystallinity of the sheet in Step (3) (a) is in the range of about 5% to about 15%.

16. The process of claim 12, wherein said differential in applied pressure is in the range of up to about 5 atmospheres.

17. The process of claim 12, wherein said differential in applied pressure is about 1 atmosphere.

* * * * *

UNITED STATES PATENT OFFICE
CERTIFICATE OF CORRECTION

Patent No. 4,127,631              Dated November 28, 1978

Inventor(s) Robert E. Dempsey and James L. Throne

It is certified that error appears in the above-identified patent and that said Letters Patent are hereby corrected as shown below:

| Patent Col. | Line | |
|---|---|---|
| Fig. 10 | | "Cryatallization Temperature" should read -- Crystallization Temperature -- |
| 5 | 14 | "and more" should read -- the more -- |
| 7 | 43* | "homogenous" should read -- homogeneous -- |
| 9 | 15* | "die head 23 chill" should read -- die head 23, chill -- |
| 15 | 20 | "sheet is" should read -- sheet which is -- |

Signed and Sealed this

Tenth Day of July 1979

[SEAL]

Attest:

*Attesting Officer*

LUTRELLE F. PARKER
*Acting Commissioner of Patents and Trademarks*